United States Patent [19]
Van Hout et al.

[11] Patent Number: 5,479,823
[45] Date of Patent: Jan. 2, 1996

[54] METHOD AND APPARATUS FOR INDUCING AUDIO VIBRATIONS

[75] Inventors: James E. Van Hout, Auburn Hills; Alexander J. Owski, Redford; Anthony J. Mangiapane, Sterling Heights; Charles T. Briggs, III, Southfield, all of Mich.

[73] Assignee: Chrysler Corporation, Highland Park, Mich.

[21] Appl. No.: 333,657

[22] Filed: Nov. 3, 1994

[51] Int. Cl.⁶ ........................................ G01H 1/00
[52] U.S. Cl. ............................... 73/579; 73/588
[58] Field of Search ..................... 73/579, 588, 618, 73/619, 624, 632, 633

[56] References Cited

U.S. PATENT DOCUMENTS

| | | |
|---|---|---|
| 4,584,714 | 6/1984 | Fukuhara . |
| 4,625,083 | 11/1986 | Poikela . |
| 4,728,922 | 3/1988 | Christen et al. ............. 340/52 R |
| 4,829,590 | 5/1989 | Ghose . |
| 4,947,356 | 8/1990 | Elliot et al. . |
| 4,989,455 | 2/1991 | Gomyo et al. ................. 73/662 |
| 5,034,977 | 7/1991 | Chen et al. . |
| 5,119,503 | 6/1992 | Mankovitz .................... 455/45 |
| 5,170,433 | 12/1992 | Elliott et al. . |
| 5,198,779 | 3/1993 | Bruton . |
| 5,222,148 | 6/1993 | Yuan . |
| 5,245,664 | 9/1993 | Kinoshite . |
| 5,353,109 | 10/1994 | Langdon et al. ............. 73/657 |

*Primary Examiner*—Richard Chilcot
*Assistant Examiner*—Max Noori
*Attorney, Agent, or Firm*—Christopher A. Taravella

[57] ABSTRACT

A method and apparatus of inducing vibrations and buzzes within a vehicle, e.g., from panel trim, provides a reliable and repeatable way to identify the sources of such vibrations and buzzes. According to the method, an FM transmitter modulates and transmits predetermined frequency signals to a standard FM receiver located in the interior of the car. The FM receiver receives and demodulates the signal, and then applies it to audio speakers also located within the vehicle. The output signal from the speakers induces sympathetic vibrations in vehicle components, allowing a tester to identify the sources of the vibrations and buzzes so that they may be corrected. The transmitter provides a means for a user to maintain a constant frequency or to vary the frequency within a predetermined range of frequencies. The frequency may be generated by digitally storing one complete sine wave in successive memory locations. The values can then be retrieved and converted to an analog signal. Higher frequencies are obtained by sampling at a constant rate, but skipping some of the values, thereby retrieving the sine wave at a faster rate.

30 Claims, 5 Drawing Sheets

METHOD AND APPARATUS FOR INDUCING AUDIO VIBRATIONS

BACKGROUND OF THE INVENTION

The present invention relates to a method for inducing audio vibrations e.g. buzzes, rattles, and other noise in the interior of a vehicle in order to determine the source of such noise within the vehicle. In particular, the invention relates to the use of an FM broadcast transmitter to transmit audio frequency sine waves to an FM receiver in the interior of the vehicle in order to induce sympathetic vibrations, e.g. buzzes and rattles, from equipment in the interior of the vehicle that may be a source of noise during normal use of the vehicle.

Within a vehicle, sounds and vibrations from radio loudspeakers, the engine and other normal internal and external equipment produce sympathetic vibrations in neighboring items, such as trim panels, instrument panel components, etc., just as a tuning fork excites a piano string. Sympathetic vibrations within a vehicle are often heard as buzzes that seem to be random in time and space, or may beat in time to musical programming.

Although the presence of small, frequency-sensitive buzzes may appear inconsequential, their net effect is to detract from the customer's perception of overall vehicle and sound system quality. Thus, particularly in the automotive industry, there is a need for a system to induce these annoying buzzes so that their sources can be identified and modified so as to reduce or eliminate them.

U.S. Pat. No. 5,245,664 to Kinoshite et al. discloses an active noise control system. The system includes a plurality of vibration pickups for detecting noise sources. A controller, responsive to the detected noise sources, generates "control sounds" or "anti-noise" to interfere with or cancel the effect of the detected noises. U.S. Pat. No. 4,829,590 to Ghose, U.S. Pat. No. 5,170,433 to Elliot et al., and U.S. Pat. No. 5,222,148 to Yuan disclose similar types of systems. These patents, however, do not address the problems associated with identifying sources of the noise so they can be physically modified to eliminate the noise. That is, the systems do not provide a method or means to induce noises from sources within a vehicle to allow designers and developers the opportunity to remove or modify the sources of the noise.

In a typical prior art system, audio generators placed in a vehicle under test are used to induce sympathetic vibrations. According to one known prior art system, audio frequency tones which are swept over a range of frequencies are recorded on standard audio cassettes. These cassettes are played through the vehicle's sound system to induce the vibration of potential noise sources, and they do not allow precise control over the frequency generated. In particular, the operator cannot pause at a particular frequency while the source of noise is tracked down. This system improves the repeatability of tests over those made with noise generators and allows for correlation of test results. While the sweep frequency recordings standardize testing somewhat, they do not provide a constant and exact audio frequency source, and they do not allow precise control over the frequency generated. In particular, the operator cannot pause at a particular frequency while the source of noise is tracked down. The cassettes also require that the vehicles to be tested have operating cassette players, which players are not available in many low-end models of vehicles.

SUMMARY OF THE INVENTION

It is therefore an object of this invention to provide a method for inducing sympathetic vibrations in a vehicle so that modifications can be made to the vehicle to eliminate the sources of noise.

It is another object of this invention to provide a method of testing for induced vehicle noises that may be used on a broad range of vehicles.

It is another object of this invention to improve the repeatability of vehicle noise testing.

It is yet another object of this invention to provide a consistent and controllable source of audio signals.

The present invention provides a method for using the vehicle FM radio to induce vibrations and buzzes within a vehicle to allow for the identification of the sources of the vibrations and buzzes in a reliable and repeatable fashion. In an illustrative embodiment of the invention, an FM transmitter modulates and transmits signals with predetermined and controllable frequencies to an FM receiver normally supplied with and located in the interior of the vehicle. The FM receiver receives the signal, demodulates it, and applies it to audio speakers which are also located within the vehicle. The output signal from the speakers induces sympathetic vibrations and buzzes in various vehicle components, allowing the user to identify the sources of the vibrations and buzzes so that they can be corrected or reduced.

The transmitter provides a means for the user to maintain a frequency and also vary the frequency within a predetermined range of frequencies. The preferred method for generating the frequency is to digitally store one complete sine wave in successive memory locations. The values are then retrieved and converted to an analog signal by a microprocessor. Higher frequencies are obtained by sampling at a constant rate, but skipping some of the values, thereby retrieving the sine wave at a faster rate.

BRIEF DESCRIPTION OF THE DRAWINGS

The foregoing and other features of the present invention will be more readily apparent from the following detailed description of preferred embodiments taken in conjunction with the attached drawings wherein.

DETAILED DESCRIPTION OF PREFERRED EMBODIMENTS

Figure 1:
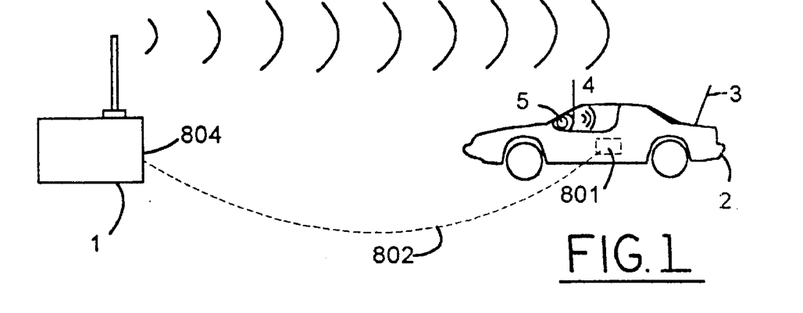
FIG. 1 is an illustration of the overall arrangement of the present invention.

FIG. 1 illustrates the general arrangement of the present invention. A signal at a constant selected frequency is frequency modulated and transmitted from an FM transmitter 1 to an FM receiver 4, preferably a conventional vehicle FM broadcast receiver located within the vehicle 2 which is under test. The transmitter can be located outside the vehicle as shown in FIG. 1 or it can be operated from within the vehicle by the user who is looking for the source of sympathetic vibrations. The receiver 4 receives the signal via antenna 3, demodulates the signal and delivers the resulting audio signal through speakers 5 which are also located within the vehicle 2. The output signal may result in sympathetic vibrations and buzzes in various components of the vehicle, such as the trim, so that the source of the vibrations and buzzes may be identified and corrected. If no vibrations are generated at one frequency, the transmitter can be controlled by the user to manually or automatically change the frequency over a range in an effort to induce the vibrations at other frequencies.

Figure 2:
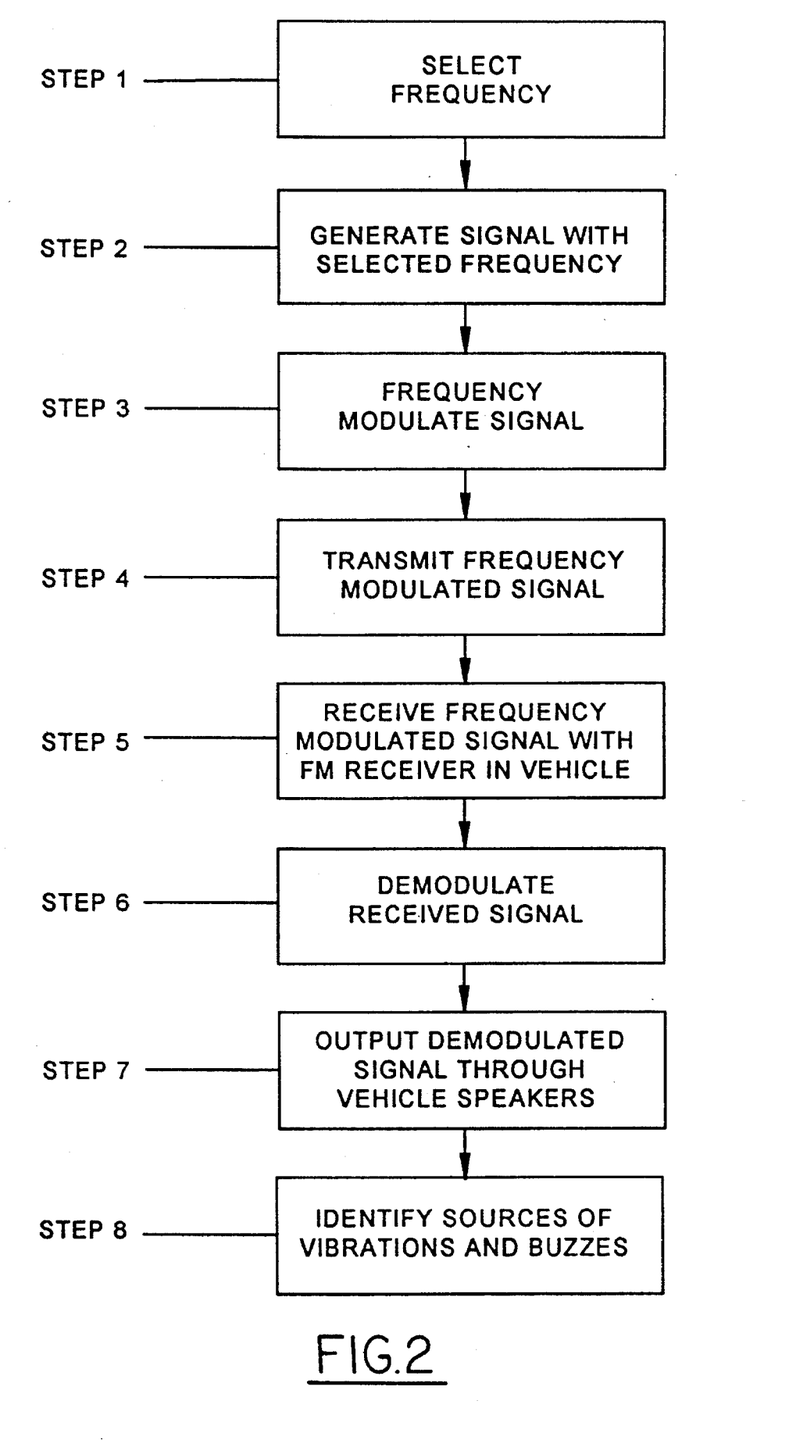
FIG. 2 is a flowchart of the method of the present invention.

Referring now to FIG. 2, a flowchart of the method of the present invention is illustrated. A frequency is selected from a predetermined range of frequencies (step 1). A signal in the form of a sine wave at the preselected frequency is then generated (step 2) and is frequency modulated with a carrier signal at a predetermined frequency (step 3). The carrier frequency shifts the signal to a band of frequencies that is receivable by a conventional vehicle FM receiver, i.e. 88–108 MHz. The frequency modulated signal is then transmitted (step 4), received by an FM receiver in a vehicle being tested (step 5), and demodulated (step 6). The resulting signal is then used to generate sound within the vehicle through the vehicle speakers (step 7). The output signal causes sympathetic vibrations in various vehicle components, thus allowing the sources of the vibrations to be identified.

One skilled in the art will understand that this method is reliable and repeatable since a single frequency can be selected and maintained so as to induce vibrations and buzzes in vehicle components sensitive to that particular frequency. Also, since most vehicles today, particularly automobiles, come equipped with an FM broadcast receiver, this testing can be performed on a wide variety of vehicles. Further, one of ordinary skill in the art will understand that this invention will work equally well with the FM receiver positioned outside the vehicle, so long as the speakers are positioned within the vehicle. Further a separate portable battery powered FM receiver unit can be placed in the vehicle and articles to the speakers of an AM radio in the vehicle if it has no FM receiver. It is, however, much more convenient to utilize an FM receiver that is equipped with the vehicle.

Figure 3:
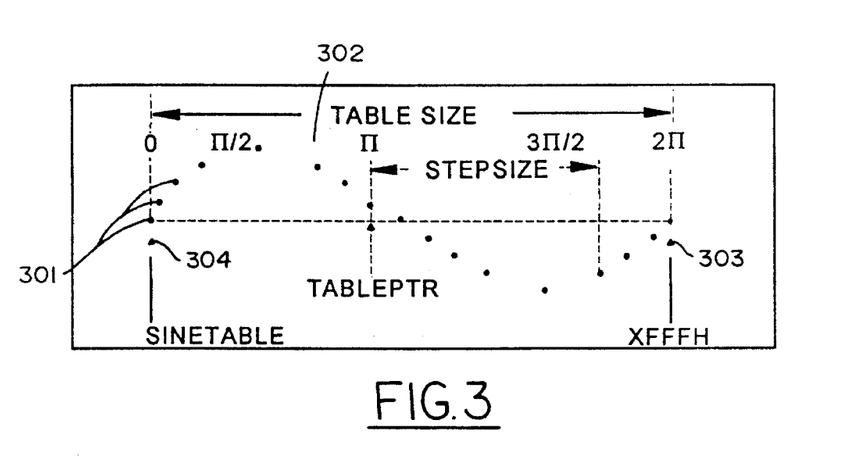
FIG. 3 is diagram of a synthesized sine wave.

In its preferred embodiment, the FM transmitter 1 generates a signal at a selected frequency from a single digitally stored sine wave. In particular, the FM transmitter, preferably including a single chip Intel 87C51FA microcontroller, has a digital synthesized sine wave stored in an EPROM. Referring to FIG. 3, data points 301, representing a single waveform 302, are stored in a table in successive memory locations. As illustrated, the end of the table is at an offset of xFFFH 303 from the beginning of the table 304. The data points 301 are retrieved from the EPROM by the microprocessor and the values are converted to an analog signal via a digital-to-analog converter which may be part of the microprocessor. If the lowest available frequency is the frequency selected, the microprocessor "steps" through or samples every table entry, thus the step size is equal to one. To increase the frequency of the signal to be generated, table entries are skipped but the sampling continues at the same rate, thus the change in the value per unit time, i.e., frequency, is increased.

The number of entries required for the table is dependant on the sample rate and the minimum frequency. The number of entries or table size can be calculated as follows:

TABLE SIZE=SAMPLE RATE/MINIMUM FREQUENCY

Figure 4:
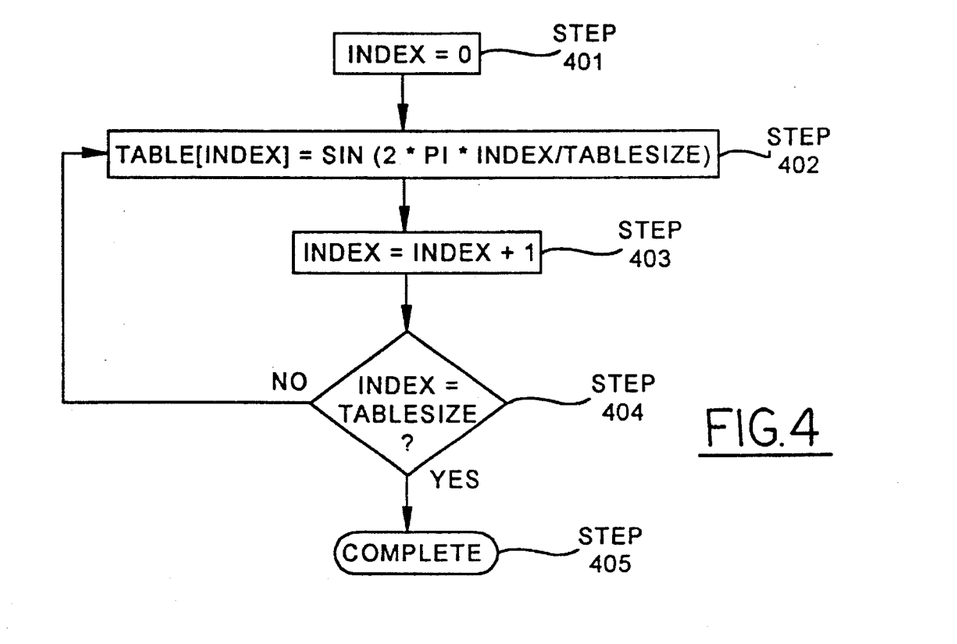
FIG. 4 is a flowchart of a method of synthesizing higher frequency digital waveforms.
Figure 5A:
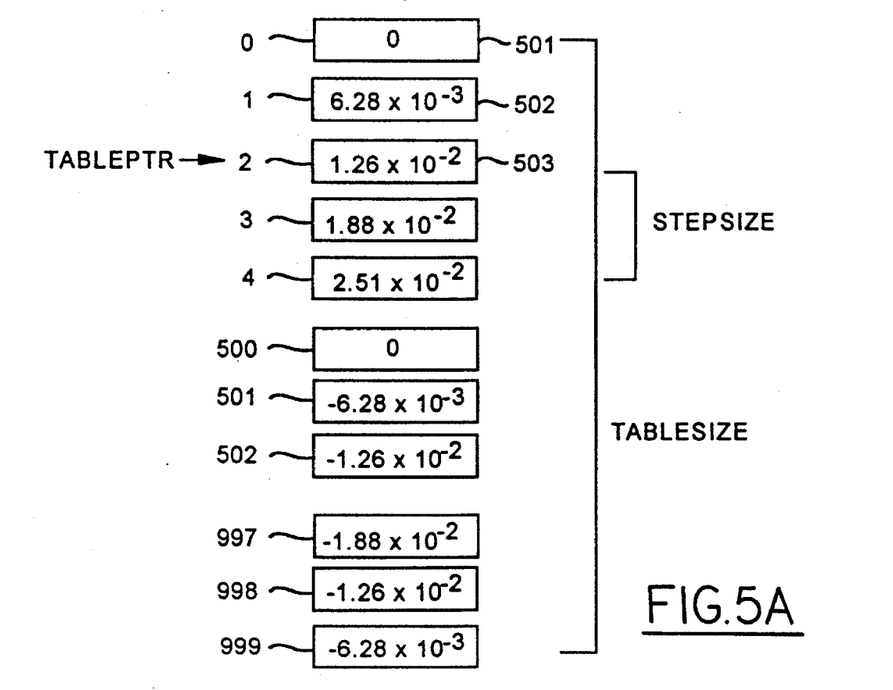
FIG. 5A is a partial table of the values representing the synthesized sine wave.

Thus, if the table values are sampled at a constant 10,000 Hz and the minimum frequency desired is 10 hz, a table size of 1000 entries is required. With the table size calculated, each value for the table can be calculated. FIG. 4 is a flowchart of the method for calculating each value of the table. FIG. 5A is a representation of the table single sine wave as it is stored in memory with table entries as calculated using the above equation. Referring to FIGS. 4 and 5, beginning with an index of 0 (step 401) each table value is easily calculated (step 402) using the formula illustrated, that is, $$\text{TABLE[index]}=\sin(2*pi*\text{index}/\text{TABLESIZE}). \quad (1)$$

Thus, the first entry (501) of the table of FIG. 5A is equal to zero, i.e., TABLE[0]= $\sin(2*pi*0/1000)$=0. The second entry (502) is calculated as TABLE[1]=$\sin(2*pi*1/1000)$= $6.28 * 10^{-3}$; and the third entry (503) as TABLE[2]=$\sin(2*pi*2/1000)$=$1.26 * 10^{-2}$. Each value of the table is similarly calculated until the entire table (FIG. 5A) is complete (step 404).

In another preferred embodiment, the table entries are scaled to an eight bit unsigned integer (0–255 decimal) before being stored, rather than storing a floating point integer. The formula for the table entries would thus be calculated as follows:

$$\text{TABLE[index]}=\text{INTEGER } (127.5 * (\sin(2*pi*\text{index}/\text{TABLESIZE}))+127.5). \quad (2)$$

Figure 5B:
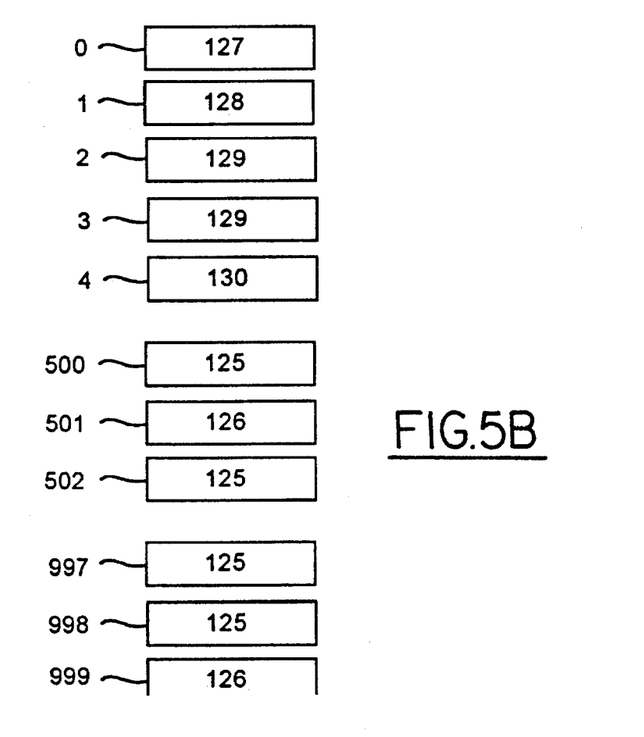
FIG. 5B is a partial table of the values representing the synthesized sine wave scaled to fit an eight bit unsigned integer.

FIG. 5B illustrates part of a 1000 entry table wherein each entry is scaled.

Once the table is complete, as illustrated in FIGS. 5A or 5B, the values can be sampled (or "stepped" through) by the microcontroller and used to produce a digital signal. In general, the step size may be calculated using the following formula:

$$\text{STEPSIZE}=\text{TABLE SIZE}/(\text{SAMPLE RATE}/\text{DESIRED FREQUENCY}). \quad (3)$$

Thus, where the table size is 1000 and the sample rate is 10,000 Hz, $$\text{STEPSIZE}=\text{DESIRED FREQUENCY}/10 \text{ Hz}. \quad (4)$$

To generate a 500 Hz signal, for example, the stepsize is 5. Thus, the first table entry (501) TABLE[0] is sampled, then TABLE[5], TABLE[10], etc. As can be easily understood by one skilled in the art, a complete cycle is generated after sampling 200 table entries. If a 10 Hz signal was to be generated instead, a complete cycle is generated only after sampling all 1000 table entries. Assuming a constant sampling rate, the 10 Hz signal will take five times as long to complete a cycle as the 50 Hz signal.

In a typical microcontroller, the step size is stored as an integer and therefore it only determines frequency to the nearest multiple of 10 Hz. To resolve frequency to the nearest Hertz, the fractional part of the step size is required. To accomplish this, the step size is maintained as two variable, namely STEPSIZEWHOLE and STEPSIZEFRACT which are calculated as follows:

STEPSIZEWHOLE=QUOTIENT (DESIRED FREQUENCY/10)(5)

STEPSIZEFRACT=REMAINDER (DESIRED FREQUENCY/10)

Referring to FIGS. 3 or 5, the actual sample output is referenced by TABLEPTR. At each sample interval, STEPSIZEWHOLE is added to TABLEPTR thus referencing a new sample. Further, STEPSIZEFRACT accumulates fractions of steps. When a whole step has been accumulated, the TABLEPTR is incremented a sample.

Figure 6:
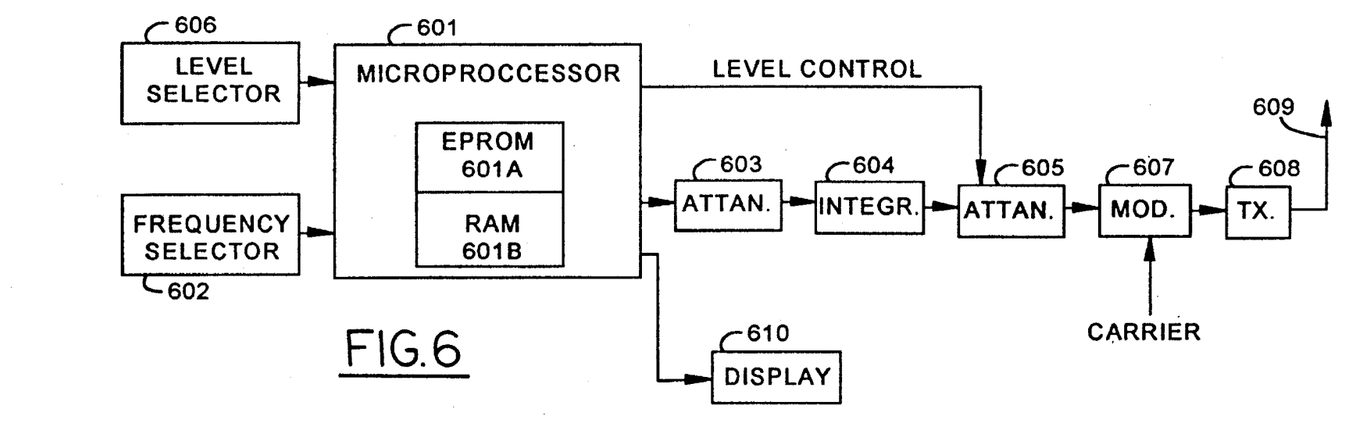
FIG. 6 is a block diagram of the preferred transmitter control circuits of the present invention.

FIG. 6 is a block diagram of the preferred transmitter controller. Referring to the figure, a frequency selection is input to a microprocessor or microcontroller 601, which has an EPROM 601A and RAM 601B, via frequency selector 602. One skilled in the art will understand that the frequency selector 602, in its simplest form, may merely send a signal to the microcontroller 601 indicating that a user wants a predetermined default frequency increased or decreased and thus may be comprised of a simple switch.

Based on the selected frequency, controller 601 sends a pulse width modulated (PWM) signal to attenuator 603. The PWM signal is based on the calculated table values (FIG. 5) as described above. In this case, the pulse width of each pulse is proportional to a sampled table value. The PWM signal is attenuated by attenuator 603 and integrated by integrator 604 to form a sine wave. Thus the microprocessor and integrator 604 act as a digital to analog converter. The sine wave is then fed into a second attenuator 605 which sets the signal level based on a user's input to the microcontroller 601 via level selector 606. One skilled in the art will understand that the level selector 606 may be as simple as the above-described frequency selector 602.

The resulting attenuated sine wave is then directed to a modulator 607 which frequency modulates the signal with a carrier signal to shift the frequency to within a frequency range receivable by a standard FM receiver found in the vehicle. The modulated signal is then sent to transmitter 608 which broadcasts the final signal through antenna 609.

As illustrated in FIG. 6, the controller 601 also controls a display 610 which displays the selected frequency and the selected level.

Figure 7:
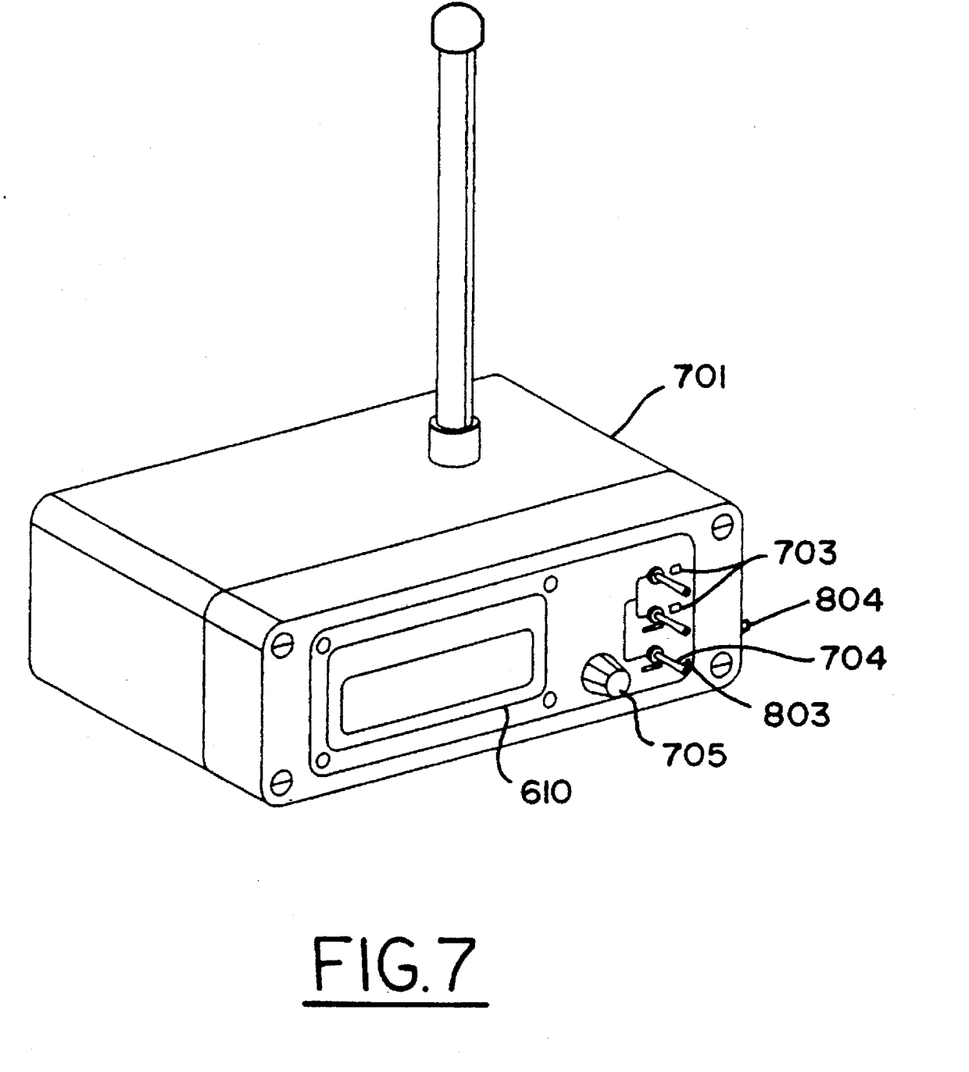
FIG. 7 illustrates the housing and controls of the preferred transmitter.

Finally, FIG. 7 illustrates the front panel display and controls of the preferred embodiment of the transmitter. Referring to FIG. 7, the transmitter is enclosed in a housing 701 preferably made of cast aluminum. The display 610, which is indicated above as controlled by microprocessor 601 and is provided for displaying the current frequency and level, is preferably a four line by twenty column liquid crystal display (LCD).

Also, as indicated above, the frequency output of the transmitter is variable, preferably between 10 and 400 Hz. Push button switches 703 are depressed by a user to direct controller 601 to increase or decrease the frequency or to increase or decrease the level. Mode switch 704 is provided to allow the user to select whether the push button switches 703 control the frequency or the attenuation level. Finally, a power switch 705 is provided for turning the transmitter on and off.

Referring again to FIG. 1, in addition to manual operation, the device may be designed to slowly sweep over a range of frequencies so that sympathetic vibrations in a range are generated without user intervention. Further, a vibration sensor 801, e.g., a strain gauge, may be placed on areas of the vehicle interior likely to produce vibrations and buzzes, e.q., the panel trim. An output from the vibration sensor 801 can, but need not, be fed back to the transmitter, e.g. by wire 802, to halt the transmitter 1 when vibrations are detected. When the source has been located, the user can start the scan again at the frequency where it stopped so the scan can continue over the rest of the frequency range. In such a case, the transmitter of FIG. 7 would have a "scan" button 803 to start or restart the automatic scan. Also, it would have a terminal 804 for receiving a sensor signal if set up to automatically stop the scan upon detection of vibrations in the vehicle. In this embodiment it is preferable to operate the transmitter from within the vehicle so the wire 802 need not pass through a window of the vehicle.

Figure 8:
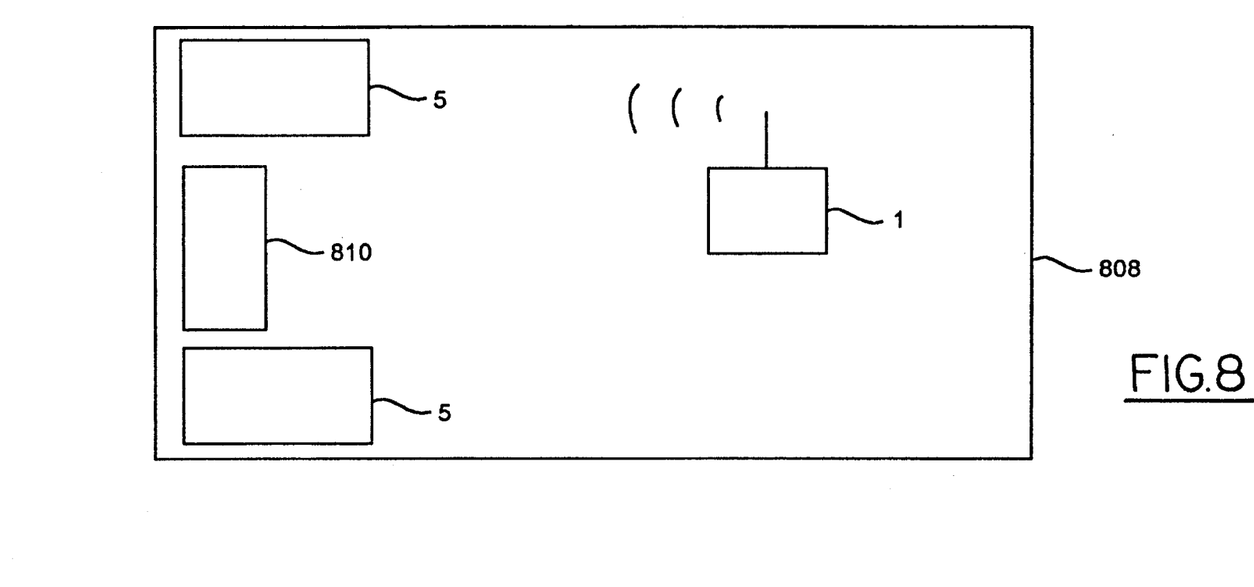
FIG. 8 is an illustration of the use of the invention in a room, showing locations of the FM receiver and the speakers.

The method and apparatus of the present invention will work equally well to detect vibrations, squeaks, and buzzes in a room or other space. For example, a stereophile may wish to "tune" a room to the stereo system installed therein. Referring to FIG. 8, a user operates transmitter 1 of the present invention in a room 808 where a stereo system including an FM receiver 810 and speakers 5 are located. The transmitter 1 transmits a signal at a given frequency to the FM receiver 810 which demodulates the signal and applies it to speakers 5. The signal from the speakers 5 cause sympathetic vibrations and buzzes in various items within the room 808. For example, crystal vases in the room 808 may vibrate at certain frequencies causing a buzzing sound, so the user may wish to remove them. As in a vehicle, the user varies the frequency of the signal, thus enabling the detection of sources of vibrations that are sensitive to the frequency. Of course, the FM receiver need not be located in the room being tested, so long as the speakers are in the room.

While the present invention has been particularly shown and described with reference to preferred embodiments thereof, it will be understood by those skilled in the art that various changes in form and details may be made therein without departing from the spirit and scope of the invention.

What is claimed is:

1. A method for testing for vibrations in the interior of a vehicle comprising the steps of:

selecting a frequency from within a predetermined range of frequencies;

generating a signal at the selected frequency;

frequency modulating the signal with a carrier signal to shift the frequency to a range of frequencies receivable by an FM receiver;

transmitting the frequency modulated signal;

receiving the transmitted signal with the FM receiver;

demodulating the received signal;

reproducing the demodulated signal through speakers located in the interior of the vehicle so as to induce sympathetic vibrations in components of the vehicle sensitive to said demodulated signal at the selected frequency; and identifying sources of the vibrations.

2. The method of claim 1 wherein the selecting steps includes selecting a frequency from the range of 10 Hz to 400 Hz.

3. The method of claim 1 wherein the generating step comprises the steps of:

storing in a memory a table of values representing a single digital sine wave;

sampling at a predetermined sample rate at least some of the values in the table, wherein the number of values sampled is based on the selected frequency;

generating a digital signal based on the sampled values; and converting the digital signal to an analog signal.

4. The method of claim 3 wherein each value in the table of values is scaled to an eight bit unsigned integer.

5. The method of claim 3 wherein the number of values in the table is defined by the equation:

TABLESIZE=SAMPLE RATE/MINIMUM FREQUENCY wherein TABLESIZE is the number of values in the table, SAMPLE RATE is the predetermined sample rate, and MINIMUM FREQUENCY is a preselected minimum frequency.

6. The method of claim 5 wherein an interval of values sampled is defined by the equation:

STEPSIZE=TABLESIZE/(SAMPLE RATE * SELECTED FREQUENCY)

where STEPSIZE is the interval, and SELECTED FREQUENCY is the selected frequency.

7. The method of claim 5 wherein the interval of values sampled is derived the following equations:

STEPSIZE=QUOTIENT (SELECTED FREQUENCY/10);

and

FRACTSTEP=REMAINDER (SELECTED FREQUENCY/10)

wherein STEPSIZE is the interval, SELECTED FREQUENCY is the selected frequency, and FRACTSTEP is a fractional part of the interval.

8. A method for testing for vibrations in the interior of a vehicle comprising the steps of:

selecting a frequency from within a predetermined range of frequencies;

generating a signal at the selected frequency;

transmitting the signal;

receiving the transmitted signal with a receiver;

using the signal to drive speakers located in the interior of the vehicle so as to induce vibrations in components of the vehicle sensitive to said signal at the selected frequency; and identifying sources of the vibrations.

9. The method of claim 8 wherein the selecting step includes selecting a frequency from the range of 10 Hz to 400 Hz.

10. The method of claim 8 wherein the generating step comprises the steps of:

storing in a memory a table of values representing a single digital sine wave;

sampling at least some of the values in the table, wherein the number of values sampled is based on the selected frequency;

generating a digital signal based on the sampled values; and converting the digital signal to an analog signal.

11. The method of claim 8 further comprising the step of:

automatically changing the selected frequency to a new frequency.

12. The method of claim 11 further comprising the step of:

repeating the steps of automatically changing, generating, frequency modulating, transmitting, receiving, demodulating, reproducing, and detecting steps until vibrations are detected.

13. A system for testing for vibrations in the interior of a vehicle comprising:

an FM transmitter for generating a signal with a frequency that can be controllably scanned within a predetermined range of frequencies;

an FM receiver for receiving the signal from said FM transmitter and reproducing the signal;

at least one speaker connected to said FM receiver positioned within the vehicle for reproducing sound related to said signal;

at least one vibration sensor located within said vehicle for detecting vibrations induced by the sound and producing a detect signal in response thereto; means connected to said FM transmitter and said vibration sensor for causing the transmitter to halt the scanning in response to the detect signal.

14. A system for testing for vibrations in the interior of a vehicle comprising:

an FM transmitter comprising memory means for storing a table of values representing a single digital sine wave, selecting means for selecting a frequency from within a predetermined range of frequencies, sampling means, connected to said memory means and said selecting means and responsive to said selecting means, for sampling at least some of the values in the table, the number of values sampled being based on the selected frequency, digital signal means connected to said sampling means for generating digital signals based on said sampled values, a digital-to-analog converter connected to said digital signal means for converting the digital signals from said digital signal means into an analog signal, a frequency modulator communicatively connected to said digital-to-analog signal converter for frequency modulating said analog signal to produce a modulated signal, and a transmitter connected to said frequency modulator for transmitting said modulated signal;

an FM receiver for receiving the transmitted modulated signal from said FM transmitter and demodulating it into a received analog signal; and at least one speaker positioned within said vehicle for receiving the received analog signal and producing a sound signal in response thereto.

15. An apparatus for transmitting constant FM signals comprising:

memory means for storing a table of values representing a single digital sine wave;

selecting means for selecting a frequency from within a predetermined range of frequencies;

sampling means connected to said memory means and said selecting means, and being responsive to said selecting means, for sampling at least some of the values in the table, the number of values sampled being based on the selected frequency;

digital signal means connected to said sampling means for generating a digital signal based on said sampled values;

a digital-to-analog converter connected to said digital signal means for converting the digital signals from said digital signal means into an analog signal;

a frequency modulator connected to said digital-to-analog converter for frequency modulating said analog signal to produce a modulated signal; and a transmitter connected to said frequency modulator for transmitting said modulated signal.

16. The apparatus of claim 15 further comprises:

a vibration detecting means for detecting vibrations;

scanning means for causing said selecting means to sequentially select frequencies in the range starting at one end of the range and progressing to the other end, said scanning means being responsive to said vibration detecting means for automatically halting the sequential selection of said frequency in response to detection of vibrations; and means for one of starting and restarting the scanning means.

17. A method for testing for vibrations in a space comprising the steps of:

selecting a frequency from within a predetermined range of frequencies;

generating a signal at the selected frequency;

frequency modulating the signal with a carrier signal to shift the frequency to a range of frequencies receivable by an FM receiver;

transmitting the frequency modulated signal;

receiving the transmitted signal with the FM receiver;

demodulating the received signal;

reproducing the demodulated signal through speakers located in the space so as to induce sympathetic vibrations in items in the space sensitive to said demodulated signal at the selected frequency; and identifying sources of the vibrations.

18. The method of claim 17 wherein the selecting steps includes selecting a frequency from the range of 10 Hz to 400 Hz.

19. The method of claim 17 wherein the generating step comprises the steps of:

storing in a memory a table of values representing a single digital sine wave;

sampling at a predetermined sample rate at least some of the values in the table, wherein the number of values sampled is based on the selected frequency;

generating a digital signal based on the sampled values; and converting the digital signal to an analog signal.

20. The method of claim 19 wherein each value in the table of values is scaled to an eight bit unsigned integer.

21. The method of claim 19 wherein the number of values in the table is defined by the equation:

TABLESIZE=SAMPLE RATE/MINIMUM FREQUENCY wherein TABLESIZE is the number of values in the table, SAMPLE RATE is the predetermined sample rate, and MINIMUM FREQUENCY is a preselected minimum frequency.

22. The method of claim 21 wherein an interval of values sampled is defined by the equation:

STEPSIZE=TABLESIZE/(SAMPLE RATE * SELECTED FREQUENCY)

where STEPSIZE is the interval, and SELECTED FREQUENCY is the selected frequency.

23. The method of claim 21 wherein the interval of values sampled is derived the following equations:

STEPSIZE=QUOTIENT (SELECTED FREQUENCY/10);

and

FRACTSTEP=REMAINDER (SELECTED FREQUENCY/10)

wherein STEPSIZE is the interval, SELECTED FREQUENCY is the selected frequency, and FRACTSTEP is a fractional part of the interval.

24. A method for testing for vibrations in a space comprising the steps of:

selecting a frequency from within a predetermined range of frequencies;

generating a signal at the selected frequency;

transmitting the signal;

receiving the transmitted signal with a receiver;

using the signal to drive speakers located in the space so as to induce vibrations in items in the space sensitive to said signal at the selected frequency; and identifying sources of the vibrations.

25. The method of claim 24 wherein the selecting step includes selecting a frequency from the range of 10 Hz to 400 Hz.

26. The method of claim 24 wherein the generating step comprises the steps of:

storing in a memory a table of values representing a single digital sine wave;

sampling at least some of the values in the table, wherein the number of values sampled is based on the selected frequency;

generating a digital signal based on the sampled values; and converting the digital signal to an analog signal.

27. The method of claim 24 further comprising the step of:

automatically changing the selected frequency to a new frequency.

28. The method of claim 27 further comprising the step of:

repeating the steps of automatically changing, generating, frequency modulating, transmitting, receiving, demodulating, reproducing, and detecting steps until vibrations are detected.

29. A system for testing for vibrations in a space comprising:

an FM transmitter comprising memory means for storing a table of values representing a single digital sine wave, selecting means for selecting a frequency from within a predetermined range of frequencies, sampling means, connected to said memory means and said selecting means and responsive to said selecting means, for sampling at least some of the values in the table, the number of values sampled being based on the selected frequency, digital signal means connected to said sampling means for generating digital signals based on said sampled values, a digital-to-analog converter connected to said digital signal means for converting the digital signals from said digital signal means into an analog signal, a frequency modulator communicatively connected to said digital-to-analog signal converter for frequency modulating said analog signal to produce a modulated signal, and a transmitter connected to said frequency modulator for transmitting said modulated signal;

an FM receiver for receiving the transmitted modulated signal from said FM transmitter and demodulating it into a received analog signal; and at least one speaker, positioned within said space for receiving the received analog signal and producing a sound signal in response thereto.

30. An apparatus for transmitting constant FM signals comprising:

memory means for storing a table of values representing a single digital sine wave;

selecting means for selecting a frequency from within a predetermined range of frequencies;

sampling means, connected to said memory means and said selecting means, and being responsive to said selecting means, for sampling at least some of the values in the table, the number of values sampled being based on the selected frequency;

digital signal means connected to said sampling means for generating a digital signal based on said sampled values;

a digital-to-analog converter connected to said digital signal means for converting the digital signals from said digital signal means into an analog signal;

a frequency modulator connected to said digital-to-analog converter for frequency modulating said analog signal to produce a modulated signal; and a transmitter connected to said frequency modulator for transmitting said modulated signal.

* * * * *